US012544943B2

(12) United States Patent
Sablatschan

(10) Patent No.: US 12,544,943 B2
(45) Date of Patent: Feb. 10, 2026

(54) BLADE SET, HAIR CUTTING APPLIANCE, AND RELATED MANUFACTURING METHOD

(71) Applicant: KONINKLIJKE PHILIPS N.V., Eindhoven (NL)

(72) Inventor: Siegfried Sablatschan, Ferlach (AT)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 17/939,043

(22) Filed: Sep. 7, 2022

(65) Prior Publication Data

US 2023/0017028 A1 Jan. 19, 2023

Related U.S. Application Data

(60) Division of application No. 16/775,326, filed on Jan. 29, 2020, now Pat. No. 11,472,049, which is a
(Continued)

(30) Foreign Application Priority Data

Jul. 4, 2014 (EP) .................................... 14175725

(51) Int. Cl.
*B26B 19/38* (2006.01)
*B26B 19/04* (2006.01)
(Continued)

(52) U.S. Cl.
CPC ........ *B26B 19/3846* (2013.01); *B26B 19/042* (2013.01); *B26B 19/063* (2013.01); *B26B 19/20* (2013.01)

(58) Field of Classification Search
CPC . B26B 19/3846; B26B 19/042; B26B 19/063; B26B 19/20
(Continued)

(56) References Cited

U.S. PATENT DOCUMENTS

| | | | |
|---|---|---|---|
| 2,098,849 | A | 11/1937 | Max |
| 2,102,529 | A | 12/1937 | Hanley |

(Continued)

FOREIGN PATENT DOCUMENTS

| | | |
|---|---|---|
| CH | 496523 | 9/1970 |
| CN | 20145688 | 11/1993 |

(Continued)

OTHER PUBLICATIONS

U.S. Appl. No. 60/586,608, filed May 9, 2000, Wruck.

*Primary Examiner* — Laura M Lee

(57) ABSTRACT

A hair cutting appliance, a blade set for a hair cutting appliance, an integrally formed metal-plastic composite stationary blade for said blade set, and a method of manufacture are described. A stationary blade includes a first wall portion arranged to serve as a skin facing wall when in operation, and a second wall portion at least partially offset from the first wall portion, such that the first wall portion and the second wall portion define therebetween an inner guide slot arranged to receive a moveable cutter blade. At least one toothed leading edge is jointly formed by the first wall portion and the second wall portion, and a plastic component comprising at least one mounting element.

13 Claims, 8 Drawing Sheets

Related U.S. Application Data continuation of application No. 15/323,600, filed as application No. PCT/EP2015/064170 on Jun. 24, 2015, now Pat. No. 10,647,010.

(51) Int. Cl.
*B26B 19/06* (2006.01)
*B26B 19/20* (2006.01)

(58) Field of Classification Search
USPC ............................................................ 30/223
See application file for complete search history.

(56) References Cited

U.S. PATENT DOCUMENTS

| | | | | | |
|---|---|---|---|---|---|
| 2,151,965 | A | | 3/1939 | Hanley | |
| 2,246,586 | A | | 6/1941 | Hanley | |
| 2,251,577 | A | | 8/1941 | Rand | |
| 2,253,737 | A | | 8/1941 | Nicholas | |
| 2,290,326 | A | | 7/1942 | Hanley | |
| 2,323,655 | A | | 7/1943 | Hanley | |
| 2,948,063 | A | | 8/1960 | Jepson | |
| 3,166,957 | A | | 1/1965 | Arjen | |
| 3,675,325 | A | | 7/1972 | Michelson | |
| 3,940,851 | A | | 3/1976 | Rookus | |
| 4,426,777 | A | * | 1/1984 | Coleman | B26B 19/102 30/34.2 |
| 4,459,334 | A | | 7/1984 | Blanpied | |
| 4,951,394 | A | | 8/1990 | Meijer | |
| 5,893,211 | A | * | 4/1999 | Hotani | B26B 19/06 30/346.51 |
| 6,082,004 | A | | 7/2000 | Hotani | |
| 9,610,695 | B2 | | 4/2017 | Obermann | |
| 9,873,203 | B2 | * | 1/2018 | Stapelbroek | B26B 19/3893 |
| 10,081,114 | B2 | | 9/2018 | Sablatschan | |
| 10,647,010 | B2 | * | 5/2020 | Sablatschan | B26B 19/3893 |
| 2009/0007442 | A1 | | 1/2009 | Kurihara | |
| 2010/0077619 | A1 | | 4/2010 | Follo | |
| 2011/0067244 | A1 | | 3/2011 | Eichhorn | |
| 2013/0008036 | A1 | | 1/2013 | Gringer | |
| 2014/0041233 | A1 | | 2/2014 | Lau | |
| 2016/0271814 | A1 | | 9/2016 | Bennik | |

FOREIGN PATENT DOCUMENTS

| | | | | | |
|---|---|---|---|---|---|
| FR | 980267 | | | 5/1951 | |
| FR | 2789341 | A1 | * | 8/2000 | B26B 1/10 |
| GB | 2266259 | | | 10/1993 | |
| GB | 2425277 | | | 10/2006 | |
| JP | 47-24797 | | | 8/1972 | |
| JP | 52-7348 | | | 2/1977 | |
| WO | 0048795 | | | 8/2000 | |
| WO | 2009024900 | | | 2/2009 | |
| WO | 2009149662 | | | 12/2009 | |
| WO | 2013150412 | | | 10/2013 | |

* cited by examiner

BLADE SET, HAIR CUTTING APPLIANCE, AND RELATED MANUFACTURING METHOD

CROSS-REFERENCE TO RELATED APPLICATIONS

The present application is a divisional of Ser. No. 16/775,326 (issued as U.S. Pat. No. 11,472,049) filed Jan. 29, 2020, which is a Continuation application of U.S. patent application Ser. No. 15/323,600 filed on Jan. 3, 2017 and issued as U.S. Pat. No. 10,647,010 on May 12, 2020, which is the U.S. National Phase application under 35 U.S.C. § 371 of International Application No. PCT/EP2015/064170, filed Jun. 24, 2015, which claims the benefit of European Patent Application Number 14175725.2 filed Jul. 4, 2014. These applications are hereby incorporated by reference herein.

TECHNICAL FIELD

The present disclosure relates to a hair cutting appliance, particularly to an electrically operated hair cutting appliance, and more particularly to a stationary blade of a blade set for such an appliance. The blade set may be arranged to be moved through hair in a moving direction to cut hair. The stationary blade may comprise a first wall portion and a second wall portion that define therebetween a guide slot, where a movable cutter blade may be at least partially encompassed and guided. The present disclosure further relates to a method for manufacturing a stationary blade and a blade set for a hair cutting appliance.

BACKGROUND

GB 2 266 259 A discloses a hair trimmer for the nose or ears, comprising a body serving as a handle and having an extension for insertion in the nose or ear with cutting means at its distal end, said cutting means comprising reciprocally movable blade means slidably engaging an anvil having at least one aperture therein for hairs to enter, and said anvil being shaped so as to form a shield which encloses the blade means.

WO 2013/150412 A1 discloses a hair cutting appliance and a corresponding blade set of a hair cutting appliance. The blade set comprises a stationary blade and a movable blade, wherein the movable blade can be reciprocatingly driven with respect to the stationary blade for cutting hair. The blade set is particularly suited for enabling both trimming and shaving operations.

For the purpose of cutting body hair, there exist basically two customarily distinguished types of electrically powered appliances: the razor, and the hair trimmer or clipper. Generally, the razor is used for shaving, i.e. slicing body hairs at the level of the skin so as to obtain a smooth skin without stubbles. The hair trimmer is typically used to sever the hairs at a chosen distance from the skin, i.e. for cutting the hairs to a desired length. The difference in application is reflected in the different structure and architectures of the cutting blade arrangement implemented on either appliance.

An electric razor typically includes a foil, i.e. an ultra-thin perforated screen, and a cutter blade that is movable along the inside of and with respect to the foil. During use, the outside of the foil is placed and pushed against the skin, such that any hairs that penetrate the foil are cut off by the cutter blade that moves with respect to the inside thereof, and fall into hollow hair collection portions inside the razor.

An electric hair trimmer, on the other hand, typically includes generally two cutter blades having a toothed edge, one placed on top of the other such that the respective toothed edges overlap. In operation, the cutter blades reciprocate relative to each other, cutting off any hairs that are trapped between their teeth in a scissor action. The precise level above the skin at which the hairs are cut off is normally determined by means of an additional attachable part, called a (spacer) guard or comb.

Furthermore, combined devices are known that are basically adapted to both shaving and trimming purposes. However, these devices merely include two separate and distinct cutting sections, namely a shaving section comprising a setup that matches the concept of powered razors as set out above, and a trimming section comprising a setup that, on the other hand, matches the concept of hair trimmers.

Common electric razors are not particularly suited for cutting hair to a desired variable length above the skin, i.e., for precise trimming operations. This can be explained, at least in part, by the fact that they do not include mechanisms for spacing the foil and, consequently, the cutter blade from the skin. But even if they did, e.g. by adding attachment spacer parts, such as spacing combs, the configuration of the foil, which typically involves a large number of small perforations, would diminish the efficient capture of all but the shortest and stiffest of hairs.

Similarly, common hair trimmers are not particularly suited for shaving, primarily because the separate cutter blades require a certain rigidity, and therefore thickness, to perform the scissor action without deforming. It is the minimum required blade thickness of a skin-facing blade thereof that prevents hair from being cut off close to the skin. Consequently, a user desiring to both shave and trim his/her body hair may need to purchase and apply two separate appliances.

Furthermore, combined shaving and trimming devices show several drawbacks since they basically require two cutting blade sets and respective drive mechanisms. Consequently, these devices are heavier and more susceptible to wear than standard type single-purpose hair cutting appliances, and also require costly manufacturing and assembling processes. Similarly, operating these combined devices is often experienced to be rather uncomfortable and complex. Even in case a conventional combined shaving and trimming device comprising two separate cutting sections is utilized, handling the device and switching between different operation modes may be considered as being time-consuming and not very user-friendly. Since the cutting sections are typically provided at different locations of the device, guidance accuracy (and therefore also cutting accuracy) may be reduced, as the user needs to get used to two distinct dominant holding positions during operation.

The above WO 2013/150412 A1 tackles some of these issues by providing a blade set comprising a stationary blade that houses the movable blade such that a first portion of the stationary blade is arranged at the side of the movable blade facing the skin, when used for shaving, and that a second portion of the stationary blade is arranged at the side of the movable blade facing away from the skin when in use. Furthermore, at a toothed cutting edge, the first portion and the second portion of the stationary blade are connected, thereby forming a plurality of stationary teeth that cover respective teeth of the movable blade. Consequently, the movable blade is guarded by the stationary blade.

This arrangement is advantageous insofar as the stationary blade may provide the blade set with increased strength and stiffness since the stationary blade is also present at the side of the movable blade facing away from the skin. This may generally enable a reduction of the thickness of the first portion of the stationary blade at the skin-facing side of the movable blade. Consequently, since in this way the movable blade may come closer to the skin during operation, the above blade set is well-suited for hair shaving operations. Aside from that, the blade set is also particularly suited for hair trimming operations since the configuration of the cutting edge, including respective teeth alternating with slots, also allows longer hairs to enter the slots and, consequently, to be cut by the relative cutting motion between the movable blade and the stationary blade.

However, there is still a need for improvement in hair cutting devices and respective blade sets. This may particularly involve user comfort related aspects, performance related aspects, and manufacturing related aspects. Manufacturing related aspects may involve suitability for series production or mass production.

SUMMARY

It is an object of the present disclosure to provide an alternative stationary cutter blade, and a corresponding blade set that enables both shaving and trimming. In particular, a stationary blade and a blade set may be provided that contribute to a pleasant user experience in both shaving and trimming operations. More preferably, the present disclosure may address at least some drawbacks inherent in known prior art hair cutting blades as discussed above, for instance. It would be further advantageous to provide for a blade set that may exhibit an improved operating performance while preferably reducing the time required for cutting operations. It is further preferred to provide for a corresponding method for manufacturing such a stationary blade. It is particularly desired to present a manufacturing method that may permit the production of blade sets and particularly of stationary blades in a cost-efficient manner and with appropriate process capability. According to a first aspect of the disclosure an integrally formed metal-plastic composite stationary blade for a blade set of a hair cutting appliance is presented, said blade set being arranged to be moved through hair in a moving direction to cut hair, said stationary blade comprising:

- a first wall portion arranged to serve as a skin facing wall when in operation,
- a second wall portion at least partially offset from the first wall portion, such that the first wall portion and the second wall portion define therebetween a guide slot arranged to receive a movable cutter blade,
- at least one toothed leading edge jointly formed by the first wall portion and the second wall portion, and
- a plastic component comprising at least one mounting element,
  - wherein the at least one toothed leading edge comprises a plurality of teeth,
  - wherein the first wall portion and the second wall portion are integrally made from a metal component, particularly from a sheet metal component,
  - wherein the first wall portion and the second wall portion mutually define an inner metal shell of the stationary blade, and
  - wherein the plastic component is molded to the second wall portion.

This aspect is based on the insight that a single metal component may be processed so as to form both the first wall portion and the second wall portion of the stationary blade. When in operation, the first wall portion may be in close contact with the skin. The first wall portion may be basically configured to cooperate with a movable cutter blade to cut hair. It is generally desired that the first wall portion is considerably thin-walled so as to allow cutting hairs close to the skin. However, a required minimum thickness of the first wall portion basically limits the minimum cutting length. It is therefore beneficial to add the second wall portion to the first wall portion so as to strengthen the stationary blade. In other words, the first wall portion and the second wall portion may define a substantially closed contour which surrounds the guide slot for the movable cutter blade. Consequently, the stationary blade may be considerably rigid which may avoid undesired deflections of the blade set during operation. Since particularly the second wall portion which is not necessarily involved in the process of cutting hair may strengthen the stationary blade, the first wall portion may become even thinner which may particularly improve the hair shaving performance of the hair cutting appliance.

In accordance with the above aspect, the plastic component is molded to the second wall portion. However, this does not necessarily exclude that the plastic component is also at least partially molded to the first wall portion or to a transition between the first wall portion and the second wall portion.

It is preferred that the raw or blank metal component from which the first wall portion and the second wall portion are made is a sheet metal component. More preferably, the metal component is initially provided as a basically flat sheet metal component. This may also involve that the metal component is supplied from a coil. Consequently, the first wall portion and the second wall portion may basically have a similar or even the same thickness. However, since in accordance with the above aspect a second wall (which may also be referred to as bottom wall) is added to the first wall (which may also be referred to as top wall or skin-facing wall), a considerably stiff arrangement may be provided. It is particularly preferred that the first wall portion and the second wall portion are processed so as to define a basically closed design. This may involve that the first wall portion and the second wall portion define a basically closed shell which circumscribes the guide slot. A basically closed design or cross section may generally provide an improved stiffness and an increased sectional modulus compared to open designs or open sections having a similar cross sectional area.

Consequently, the first wall portion and the second wall portion may define an inner frame structure which is preferably configured such that the movable cutter blade may be received in the guiding slot without the need of adding further mounting components to define a vertical position (Z-position) of the movable cutter blade with respect to the first wall portion. In other words, the inner metal shell of the stationary blade which is formed in accordance with the above aspect may provide a defined clearance for the movable cutter blade. Thus, it is not necessarily required to add further biasing members (e.g. leaf springs) that urge the movable cutter blade against the first wall portion of the stationary blade.

Preferably, the stationary blade is an integrally formed stationary blade. This involves that a plastic component is molded to the metal component. It is particularly preferred that molding the plastic component and bonding the plastic component to the metal component is performed in a single integrated manufacturing step or process. Consequently, no further assembly steps are necessary. Furthermore, no fasteners or distinct mounting elements are required.

Generally, the plastic component may be arranged as an attachment interface of the stationary blade. By way of example, the stationary blade may be arranged as a snap-on stationary blade which may be releasably attached to a receptacle of a hair cutting appliance. Consequently, the at least one mounting element of the plastic component may be arranged as a snap-on element.

In one embodiment, the metal component is a bent sheet metal component, wherein the at least one toothed leading edge is formed at a bending zone, particularly a U-shaped bending zone, of the metal component, and wherein the teeth or the at least one toothed leading edge are formed from a pattern of slots arranged at the metal component, wherein the slots are generally extending in a longitudinal direction X.

As indicated above, the metal component may be initially provided as a sheet metal component. By way of example, a basically rectangular blank may be provided. The blank may be processed so as to define a plurality of slots therein. The slots may basically extend in the longitudinal direction X. Preferably, a plurality of parallel slots is provided. Between the slots, respective strips may be provided. Generally, the slots may be arranged as elongated holes. In other words, the slots may be arranged as closed slots respective elongated holes that are surrounded by metal material of the metal component.

Bending the metal component may basically involve folding or bending the metal component around a bend edge or profile which basically extends in a lateral direction Y which is basically perpendicular to the longitudinal direction X. Furthermore, the bend profile or bend edge is preferably positioned in a center portion of the longitudinal extension of the slots. In other words, the longitudinally oriented slots and strips are bent around the laterally extending bend edge. Consequently, the strips of the slot arrangement may define teeth of the inner metal shell which alternate with respective tooth slots defined by the slots in the basically flat metal component. Thus, the teeth of the metal component may basically comprise a U-shaped cross-sectional profile, when viewed in a cross-sectional plane perpendicular to the lateral direction Y. More generally, the toothed leading edge of the stationary blade may be formed by deforming or bending a grid structure of the substantially flat metal component.

In the U-shaped profile of the teeth, respective teeth of the movable cutter blade may be arranged so as to cooperate with the teeth of the stationary blade to cut hair.

In another embodiment, the teeth of the at least one toothed leading edge comprise, when viewed in a cross-sectional plane perpendicular to the lateral direction Y, a substantially U-shaped form comprising a first leg at the first wall portion and a second leg at the second wall portion, wherein the first leg and the second leg merge into one another at their tips. Generally, the tips of the teeth may be arranged in the bending zone of the metal component.

In still another embodiment of the stationary blade, the first leg, when viewed in a cross-sectional plane perpendicular to the longitudinal direction X, comprises lateral cutting edges that are arranged to cooperate with respective cutting edges of the movable cutter blade, wherein the second leg, when viewed in a cross-sectional plane perpendicular to the longitudinal direction X, comprises a tapered portion at the top side (the side facing the first wall portion) thereof, wherein the tapered portion is covered with plastic material of the plastic component.

Generally, the cutting edges may be arranged at longitudinally extending edges of the bottom side (the side facing away from the skin) of the first leg. Opposed edges at the skin-facing side of the first legs may be smoothened so as to avoid skin irritations. Smoothening skin-facing edges may involve rounding and/or chamfering. By contrast, the edges at the skin-facing top side of the second legs may comprise a tapering towards the first legs. Hence, the open space created by the tapering may be filled with the plastic material which may further strengthen the bonding between the metal component and the plastic component.

It may be generally preferred that the second legs of the teeth comprise a lateral extension that is smaller than the lateral extension of the first legs. As already indicated above, it may be preferred that the plastic material is bonded to at least a second wall portion which may include the second legs of the respective teeth. So as to further improve the bonding force between the plastic component and the metal component, it may be preferred that the plastic component contacts the second legs of the teeth at their bottom side (facing away from the skin) and at their lateral sides. Due to the tapering, respective lateral faces of the second legs may be at least slightly inclined. Consequently, viewed in a cross-sectional plane perpendicular to the longitudinal direction X, a bottom side of the second leg may have a greater lateral extension than a respective top side. This may have the advantage that more space to be filled with plastic material is provided. This may ensure that a required minimum thickness of the plastic material adjacent to the top side of the second legs is provided. It may be generally preferred that, on the one hand, the plastic component covers the bottom side and the lateral sides of the second legs of the teeth. On the other hand, it may be further preferred that also the integrally formed structure of the second leg of the teeth and the plastic coverage has an overall lateral extension that is basically similar to the lateral extension of the first leg of the teeth.

It is worth mentioning in this connection that generally no plastic material is bonded to the first legs of the teeth. This applies in particular to portions of the first legs that are fitted with respective cutting edges. However, at least in some embodiments, plastic material is also bonded to the tips or the transition zones where the first legs and the second legs are mutually interconnected.

In yet another embodiment, the stationary blade comprises a first toothed leading edge and a second toothed leading edge, wherein the first wall portion extends from the first toothed leading edge to the second toothed leading edge in a basically continuous fashion, wherein the second wall portion comprises a frontal portion extending from the first toothed leading edge to a center portion, and a rear portion extending from the second toothed leading edge to the center portion, wherein narrow sides of the frontal portion and the rear portion face each other at the center portion.

Consequently, two respective patterns (or, more specifically, rows) of slots may be processed at the initially basically flat metal component. The first toothed leading edge and the second toothed leading edge may be defined by bending the metal component around respective bend profiles or bend edges. Needless to say, also a respective bending die may be provided for each of the first and second toothed leading edge. Generally, each of the first toothed leading edge and the second toothed leading edge may comprise a bending angle of approximately 180° (degrees). Generally, the first wall portion and the second wall portion, particularly the respective first legs and second legs thereof, may be arranged substantially parallel to each other. Consequently, a precise clearance dimension for the movable cutter blade may be provided.

The above embodiment may be further developed in that the narrow sides are mutually connected at the center portion, particularly, mutually bonded. In some embodiments, the plastic component covers at least some bonding spots at the bottom side of the second wall portion. By bonding the narrow sides of the frontal portion and the opposite rear portion, a closed structure or ring structure of the metal shell may be achieved. Bonding the frontal portion and the rear portion may further improve the dimensional stability of the metal shell. Bonding may involve metal bonding, particularly laser bonding or more particularly laser spot bonding. Generally, a gap may be provided between the facing narrow sides of the frontal portion and the rear portion. Along the gap, at least some bonding spots may be provided. It is generally preferred that the gap is covered with plastic material. Since the plastic material is basically areally bonded to the second wall portion which is composed of the frontal portion and the rear portion, the dimensional stability of the metal shell may be even further improved. Furthermore, the strength and rigidity of the stationary blade may be even further increased.

In yet another embodiment, the metal component from which the first wall portion and the second wall portion are made extends from the frontal portion at the second wall portion over the first toothed leading edge, the first wall portion and the second toothed leading edge towards the rear portion at the second wall portion. Both the first wall portion and the second wall portion may be generally flat or planar. The first wall portion and the second wall portion may extend substantially parallel to each other and define therebetween the guide slot.

In still another embodiment, the metal component, when viewed in a cross-sectional plane perpendicular to the lateral direction Y, basically encloses the guide slot for the movable cutter blade. In other words, the movable cutter blade may be vertically guided and longitudinally guided in the guide slot defined by the metal shell formed from the first wall portion and the second wall portion. Generally, the movable cutter blade may be movable in the lateral direction Y with respect to the stationary blade.

In still another embodiment, the plastic component and the metal component form an integrally formed part selected from the group consisting of insert-molded part, outsert-molded part and overmolded part. It may be therefore preferred that the metal component, preferably in its bent and bonded state, is arranged in a mold, particularly an injection molding mold, to which fluid plastic material may be injected. Consequently, the plastic material may be molded to the metal component, thereby defining the plastic component and the integrally shaped design of the stationary blade. It may be further preferred in this regard that a substitute component is arranged in the guide slot so as to keep clear a respective space for the movable cutter blade during the molding process.

In still another embodiment, the second wall portion comprises at least one cut-out portion defining at least one opening through which, in the mounted state, the movable cutter blade is accessible for a transmitting member. Generally, the movable cutter blade may comprise a basically flat or planar shape or extension. For driving the movable cutter blade with respect to the stationary blade, the transmitting member may be attached to the movable cutter blade. The transmitting member may comprise a respective engagement portion which can be engaged by a driving member (e.g., a driving shaft) of the hair cutting appliance. By way of example, the transmitting member may be bonded to the movable cutter blade. In some embodiments, the transmitting member may be releasably attached to the movable cutter blade. Generally, attaching or bonding the transmitting member to the movable cutter blade may secure the movable cutter blade at the stationary blade. This may have the advantage that no further fastener or securing member for the movable cutter blade is required. By contrast, the transmitting member, in the mounted state, may extend through the at least one opening in the stationary blade which may prevent an undesired lateral detachment of the movable cutter blade.

According to a further aspect of the present disclosure a blade set for a hair cutting appliance is presented, said blade set being arranged to be moved through hair in a moving direction to cut hair, said blade set comprising:

- a stationary blade formed in accordance with at least some of the principles of the present disclosure and,
- a movable cutter blade comprising at least one toothed leading edge, said movable cutter blade being movably arranged within the guide slot defined by the stationary blade, such that, upon relative motion between the movable cutter blade and the stationary blade, the at least one toothed leading edge of the movable cutter blade cooperates with corresponding teeth of the stationary blade to cut hair caught therebetween in a cutting action.

It is particularly preferred that the blade set consists of the stationary blade and the movable cutter blade. This may involve a driving force transmitting member for the movable cutter blade. In other words, it is preferred at least in some embodiments that the blade set comprises no further element. It is particularly preferred that the movable cutter blade is arranged in the guide slot without being biased by a separate biasing member, such as a biasing spring element. Consequently, it is preferred that a top side of the movable cutter blade is in contact with the first wall portion and that a bottom side of the movable cutter blade is in contact with the second wall portion. It goes without saying that the movable cutter blade may be arranged in a guide slot with a certain clearance with respect to the first wall portion and the second wall portion, respectively, since the movable cutter blade is preferably slidably arranged in the guide slot.

Relative motion may involve reciprocating motion of the movable cutter blade with respect to the stationary blade. In some embodiments, relative motion may involve rotation of the movable cutter blade with respect to the stationary blade.

According to yet another aspect of the disclosure a method of manufacturing an integrally formed metal-plastic composite stationary blade of a blade set for a hair cutting appliance is presented, said method comprising the following steps:

- providing a substantially flat metal component, particularly a sheet metal component,
- forming at least one pattern of slots in the metal component, thereby defining at least one toothed leading edge,
- forming a metal shell comprising a first wall portion and a second wall portion, wherein the step of forming the metal shell includes bending the substantially flat metal component, wherein the second wall portion is formed from a frontal portion and a rear portion that are arranged at opposite ends of the substantially flat metal component, wherein the first wall portion and the second wall portion jointly form at least one toothed leading edge, the first wall portion being arranged to serve as a skin facing wall when in operation, the second wall portion being at least partially offset from the first wall portion, such that the first wall portion and the second wall portion define therebetween a guide slot for a movable cutter blade, wherein the at least one toothed leading edge comprises a plurality of teeth, and providing a substitute component that is configured to keep clear the guide slot of the stationary blade when molding, providing a mold, particularly an injection mold, the mold defining a shape of a plastic component, arranging the bent metal component and the substitute component in the mold, forming, particularly injection molding, the plastic component, the plastic component, wherein the plastic component comprises at least one mounting element, and removing the substitute component from the metal-plastic composite stationary blade.

In one embodiment of the method, the step of forming the metal shell further comprises at least one of the following steps:

providing a substantially laterally extending bending core, wherein the bending core is preferably embodied by the substitute component, wherein the bending core remains in the guide slot after bending, forming at least one toothed leading edge at a bending zone, particularly a U-shaped bending zone, of the metal component, and mutually connecting opposite narrow sides of the frontal portion and the rear portion, particularly bonding the opposite narrow sides.

It may be generally preferred that the bending core stiffens the metal shell. Consequently, the desired shape of the metal shell may be maintained during further stages of the manufacturing process. This may basically involve that the metal shell as such is basically dimensionally and geometrically unstable after the bending process. The inner metal shell may be provided with the required rigidity and stiffness after the molding process when the plastic component is molded to the metal component. The metal shell may be formed at the bending core in a pre-tensioned state. Bonding respective narrow sides of the basically sheet metal component and molding the plastic component thereto may “freeze” the shape of the metal shell.

It may be generally preferred that the bending core and the substitute component are embodied by the same part. In other words, the bending core may remain in the formed metal shell after the bending and bonding process. Consequently, the metal component and the bending core may be arranged in the mold such that the bending core keeps clear the guide slot during the injection molding process. However, in some embodiments, separate distinct components may be used. That is, the substitute component for molding and the bending core for bending may be different from each other. Generally, the bending core and the substitute component may be arranged as re-usable components. In the alternative, the bending core and the substitute component may be arranged as sacrificial components. Typically, sacrificial components are damaged or destroyed during the manufacturing process.

In yet another embodiment of the method, the step of forming at least one pattern of slots in the metal component further comprises machining the metal component, wherein machining the metal component comprises machining substantially longitudinally extending slots, forming cutting edges at a first wall portion of the slots and preferably forming tapered portions at a second wall portion of the slots, and wherein the step of machining the metal component utilizes at least one process selected from the group consisting of:

cutting, particularly laser cutting, etching, particularly electrochemical etching, stamping, coining, eroding, particularly wire-eroding, and combinations thereof.

It may be preferred that respective strips between the slots of the slot patterns are machined so as to serve their intended purpose. The portion of the strips (between the slots) that, later on, forms the first leg of the teeth, may be provided with respective cutting edges. The portion of the strips between the slots that, later on, forms the second leg of the teeth to which the plastic material is bonded, may comprise a respective receiving or anchoring geometry to increase bonding forces and to ensure required minimum thicknesses of the plastic material.

According to still another aspect of the disclosure, a method of manufacturing a blade set for a hair cutting appliance is presented, said method comprising the following steps:

manufacturing a stationary blade formed in accordance with at least some aspects of the present disclosure, providing a movable cutter blade comprising at least one toothed leading edge arranged to cooperate with at least one respective toothed leading edge of the stationary blade, and inserting the movable cutter blade into the guide slot of the stationary blade, particularly feeding the movable cutter blade through a lateral opening of the stationary blade.

Preferred embodiments of the invention are defined in the dependent claims. It shall be understood that the claimed method has similar and/or identical preferred embodiments as the claimed device and as defined in the dependent claims.

BRIEF DESCRIPTION OF THE DRAWINGS

Several aspects of the disclosure will be apparent from and elucidated with reference to the embodiments described hereinafter. In the following drawings

DETAILED DESCRIPTION

Figure 1:
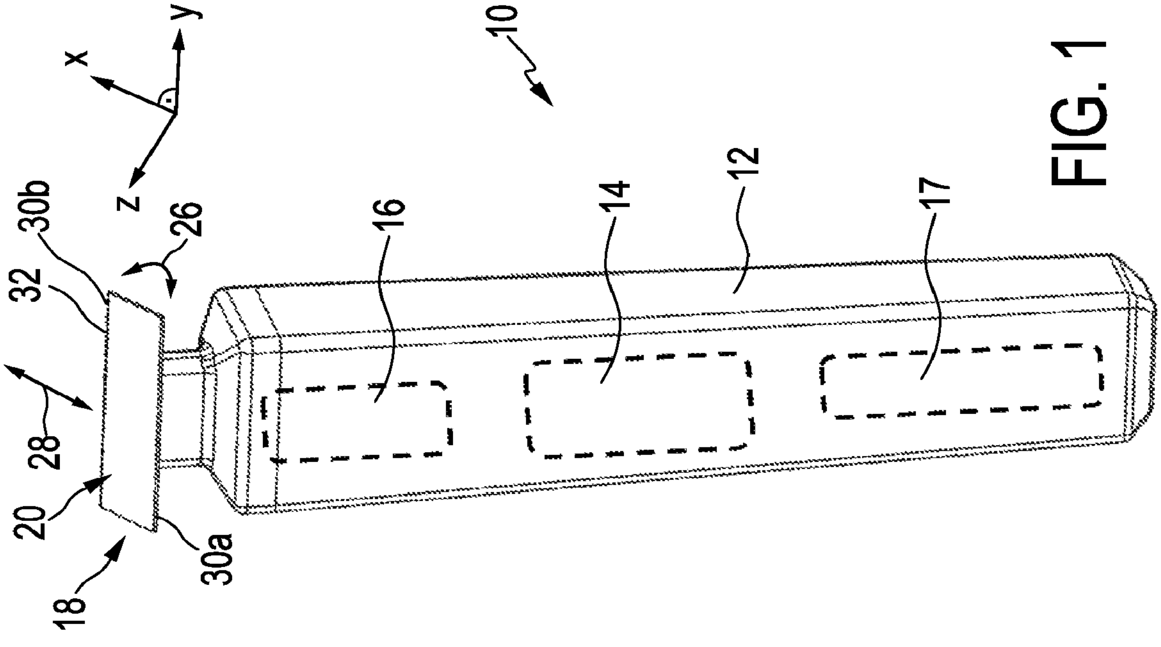
FIG. 1 shows a schematic perspective view of an exemplary electric hair cutting appliance fitted with an exemplary embodiment of a blade set in accordance with at least some aspects of the present disclosure.

FIG. 1 schematically illustrates, in a simplified perspective view, an exemplary embodiment of a hair cutting appliance 10, particularly an electric hair cutting appliance 10. The hair cutting appliance 10 may comprise a housing or, more particularly, a housing portion 12, a motor 14 is indicated by a dashed block in the housing portion 12, and a drive mechanism or drivetrain 16 is indicated by a dashed block in a housing portion 12. For powering the motor 14, at least in some embodiments of the hair cutting appliance 10, an electric battery 17, indicated by a dashed block in the housing portion 12, may be provided, such as, for instance, a rechargeable battery, a replaceable battery, etc. However, in some embodiments, the hair cutting appliance 10 may be further provided with a power cable for connecting a power supply. A power supply connector may be provided in addition or in the alternative to the (internal) electric battery 17.

The hair cutting appliance 10 may further comprise a cutting head 18. At the cutting head 18, a blade set 20 may be attached to the hair cutting appliance 10. The blade set 20 may be driven by the motor 14 via the drive mechanism or drivetrain 16 to enable a cutting motion. The cutting motion may generally be regarded as a relative motion between a stationary blade and a movable blade which will be further described and discussed hereinafter. Generally, a user may grasp, hold and manually guide the hair cutting appliance 10 through hair in a moving direction 28 to cut hair. The hair cutting appliance 10 may be generally regarded as a hand-guided and hand-operated electrically powered device. Furthermore, the cutting head 18 or, more particularly, the blade set 20 can be connected to the housing portion 12 of the hair cutting appliance 10 in a pivotable manner, refer to the curved double-arrow indicated by reference numeral 26 in FIG. 1. In some embodiments, the hair cutting appliance 10 or, more specifically, the cutting head 18 including the blade set 20 can be moved along skin to cut hair growing at the skin. When cutting hair closely to the skin, basically a shaving operation can be performed aiming at cutting or chopping hair at the level of the skin. However, also clipping (or trimming) operations may be envisaged, wherein the cutting head 18 comprising the blade set 20 is passed along a path at a desired distance relative to the skin.

When being guided moved through hair, the hair cutting appliance 10 including the blade set 20 is typically moved along a common moving direction which is indicated by the reference numeral 28 in FIG. 1. It is worth mentioning in this connection that, given that the hair cutting appliance 10 is typically manually guided and moved, the moving direction 28 thus not necessarily has to be construed as a precise geometric reference having a fixed definition and relation with respect to the orientation of the hair cutting appliance 10 and its cutting head 18 fitted with the blade set 20. That is, an overall orientation of the hair cutting appliance 10 with respect of the to-be-cut hair at the skin may be construed as somewhat unsteady. However, for illustrative purposes, it may be fairly assumed that the (imaginary) moving direction 28 is parallel (or generally parallel) to a main central plane of a coordinate system which may serve in the following as a means for describing structural features of the hair cutting appliance 10.

For ease of reference, coordinate systems are indicated in several drawings herein. By way of example, a Cartesian coordinate system X-Y-Z is indicated in FIG. 1. An axis X of the respective coordinate system extends in a generally longitudinal direction that is generally associated with length, for the purpose of this disclosure. An axis Y of the coordinate system extends in a lateral (or transverse) direction associated with width, for the purpose of this disclosure. An axis Z of the coordinate system extends in a height (or vertical) direction which may be referred to for illustrative purposes, at least in some embodiments, as a generally vertical direction. It goes without saying that an association of the coordinate system X-Y-Z to characteristic features and/or embodiments of the hair cutting appliance 10 is primarily provided for illustrative purposes and shall not be construed in a limiting way. It should be understood that those skilled in the art may readily convert and/or transfer the coordinate system provided herein when being confronted with alternative embodiments, respective figures and illustrations including different orientations. It is further worth mentioning that, for the purpose of the present disclosure, the coordinate system X-Y-Z is generally aligned with main directions and orientations of the cutting head 18 including the blade set 20.

Figure 2:
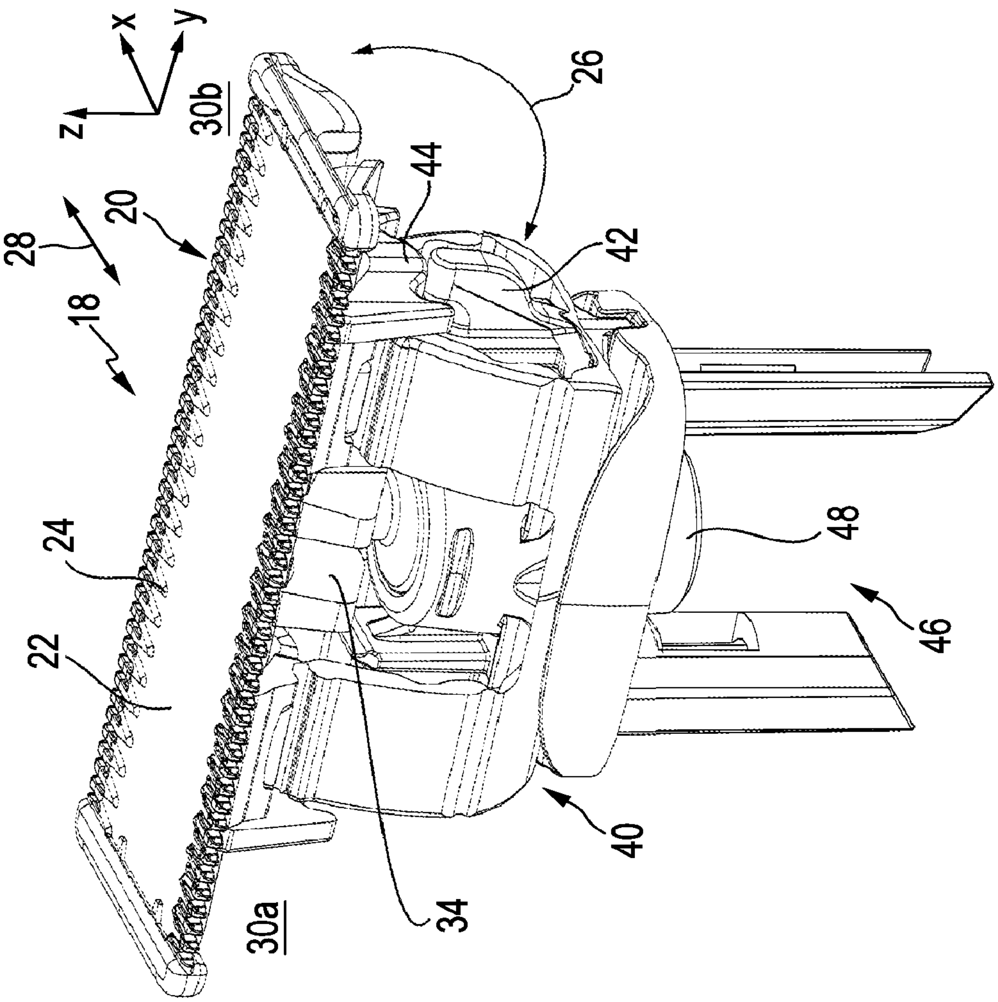
FIG. 2 is a perspective top view of a cutting head including a blade set for a hair cutting appliance.

FIG. 2 shows a perspective top of a blade set 20 that may be implemented in the cutting head 18 illustrated in FIG. 1. The stationary blade 22 of the blade set 20 may define at least one toothed leading edge 30*a*, 30*b* comprising a plurality of teeth. Also the moveable cutter blade 24 may comprise respective toothed leading edges provided with respective teeth. The moveable cutter blade 24 is indicated in FIG. 2 in a dashed representation. The moveable cutter blade 24 may be driven by a drive shaft 48 in a reciprocating manner. To this end, a transmitting member 34 may be coupled or attached to the moveable cutter blade 24. Consequently, the moveable cutter blade 24 and the stationary blade 22 may be reciprocatingly moved with respect to each other and therefore cooperate to cut hairs that enter slots between the teeth at the at least one toothed leading edge 30*a*, 30*b* when the hair cutting appliance 10 is moved through hair in the moving direction 28. As already indicated above, the blade set 20 may be particularly suited for shaving and trimming operations. Shaving performance may be further improved when the blade set 20 is capable of following an actual skin contour. Consequently, it may be preferred that the blade set 20 is pivotably attachable to the housing or housing portion 12 of the hair cutting appliance 10.

The stationary blade 22 may be arranged as a guard for the moveable cutter blade 24. It is particular preferred that the stationary blade 22 comprises a first wall portion and a second wall portion which are at least partially spaced from each other such that a guide slot for the moveable cutter blade 24 is defined therebetween. Hence, the stationary blade 22 may also cover the moveable cutter blade 24 at the at least one toothed leading edge 30*a*, 30*b*. The blade set 20 may be attached to a swiveling mechanism 40. The swiveling mechanism 40 may form a part of the cutting head 18 that is interposed between the blade set 20 and the housing portion 12. The swiveling mechanism 40 may define a pivot or, rather, a virtual pivot for the blade set 20, refer to the curved double-arrow 26 in FIGS. 1 and 2.

The swiveling mechanism 40 may further comprise a limit stop 42 to define a maximum swiveling angle of the blade set 20 with respect to the housing portion 12. At least one contact surface 44 may be associated with the blade set 20. Consequently, when the blade set 20 is pivoted about the pivot axis or the virtual pivot axis, the at least one contact surface 44 may contact the limit stop 42 and therefore limit the pivoting motion. The cutting head 18 may be regarded as a replaceable cutting head. The cutting head 18 may comprise an attachment interface 46 which is arranged to engage a respective receiving interface at the housing portion 12 of the hair cutting appliance 10. Particularly, the cutting head 18 may be arranged as a plug-in cutting head 18. As already indicated above, the blade set 20, particularly the moveable cutter blade 24 thereof, may be coupled to the drive shaft 48. The drive shaft 48 may comprise an eccentric portion that may revolve about a longitudinal axis of the drive shaft 48. Consequently, an eccentric cutting mechanism may be provided for reciprocatingly driving the moveable cutter blade 24 with respect to the stationary blade 22.

Being fitted with the swiveling mechanism 40 illustrated in FIG. 2 or with another exemplary embodiment of a swiveling mechanism 40, the cutting head 18 may be particularly suited for shaving operations. However, it is preferred that the cutting head 18 is also suited for hair trimming operations. Hair trimming may involve cutting hairs at a desired length. The desired remaining length of the hairs may be defined with a so-called attachment comb. An attachment comb may generally space the blade set 20 from a skin surface. When attaching the attachment comb to the hair cutting appliance 10, it has to be considered that the blade set 20 is basically pivotably mounted at the housing portion 12. The pivotable mounting may improve the shaving performance of the hair cutting appliance 10. However, on the other hand, it might be preferred to lock or block the orientation of the blade set 20 in the trimming mode. Locking the blade set 20 may involve maintaining the blade set 20 in a desired trimming orientation.

Figure 3:
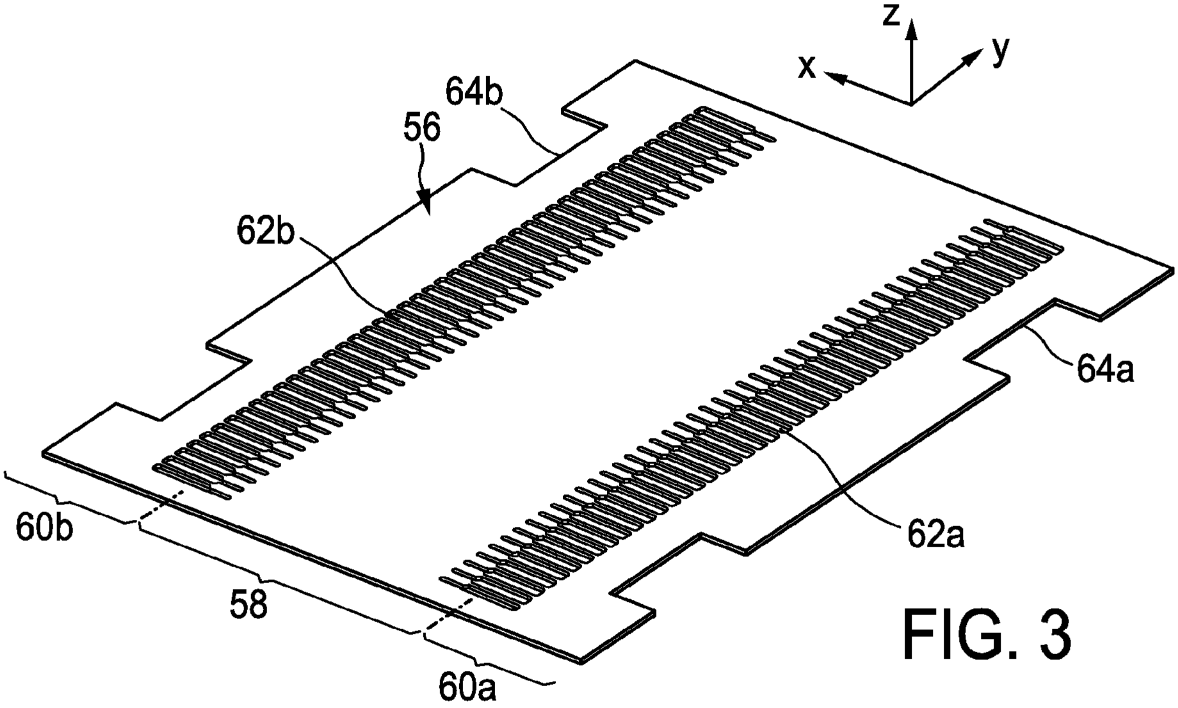
FIG. 3 is a schematic perspective bottom view of a blank for a metal component.
Figure 4:
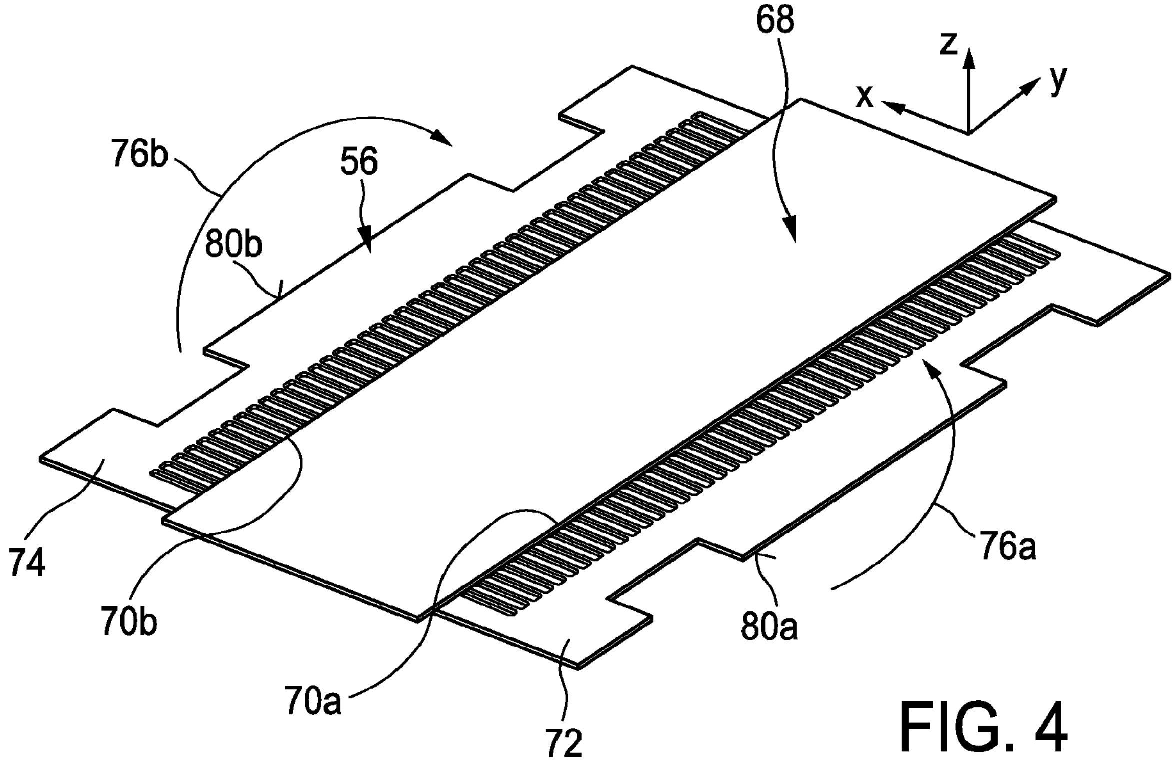
FIG. 4 shows a further perspective bottom view of a basically flat metal component, wherein a bending core is arranged at the metal component.
Figure 5:
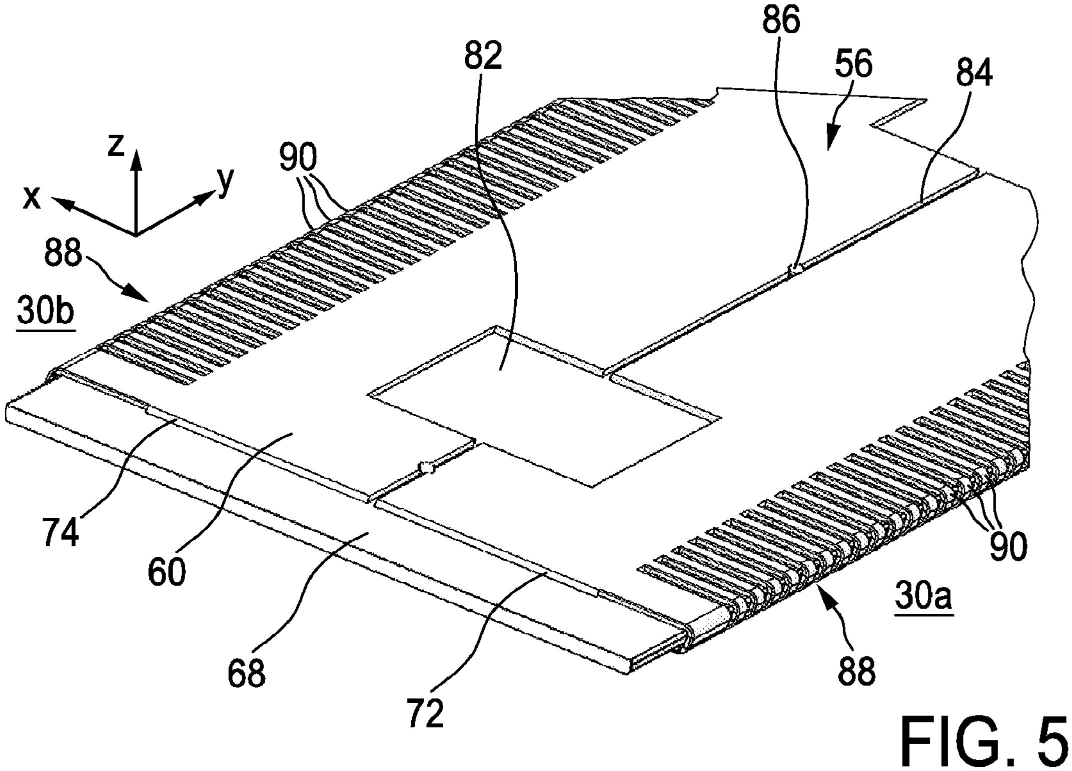
FIG. 5 is a partial perspective bottom view of a metal component in a bent state, wherein the metal component defines a metal shell.

With particular reference to FIG. 3, FIG. 4 and FIG. 5, an exemplary embodiment of a metal component 56 that may form an inner metal shell of a stationary blade 22 will be further described and illustrated. As can be best seen in FIG. 3, the metal component 56 may be arranged as a substantially flat metal component 56. More particularly, the metal component 56 may be arranged as a sheet metal component 56. The metal component 56 may be provided from a sheet metal coil, for instance. The metal component 56 may comprise a basically rectangular shape. The metal component may be arranged to define, in a deformed state, a first wall portion 58 and a second wall portion 60. As can be further seen from FIG. 3, the second wall portion 60 may be formed from two respective sections 60*a*, 60*b* that are arranged adjacent to the first wall portion 58. The metal component 56 may further comprise at least one pattern of slots 62. Preferably, a first pattern of slots 62*a* and a second pattern of slots 62*b* are provided. The respective slots 62*a*, 62*b* may be arranged in parallel. The slots 62 may basically extend in the longitudinal direction X. A respective row or pattern of slots 62*a*, 62*b* may basically extend in the lateral direction Y. Between neighboring slots 62*a*, 62*b* of the respective patterns, metal strips may be provided that, later on, form teeth 90 of the metal component 56, refer also to FIG. 5.

As can be best seen from FIG. 3 and FIG. 4, the metal component 56 may further comprise at least one cut-out 64*a* and at least one cut-out 64*b*. The at least one cutout 64 may define, in the deformed state, at least one opening 82 through which an inner space or hollow space of the metal shell formed from the metal component 56 is vertically accessible, refer also to FIG. 5. The at least one cutout 64 may be arranged at a longitudinal end of the (flat) metal component 56. Preferably, corresponding at least one cut-outs 64*a* and at least one cut-out 64*b* are provided at opposite longitudinal ends of the metal component 56.

Generally, the metal component 56 may comprise an overall thickness or vertical extension in the range of about 0.08 mm to about 0.15 mm (millimeter). It goes without saying that the first wall portion 58 and the second wall portion 60 may comprise the same thickness.

As can be best seen from FIG. 4 and FIG. 5 a substitute component 68 may be arranged at a bottom side of the metal component 56. The substitute component 68 may also be referred to as bending core or molding core. The substitute component 68 may be designed so as to define a guide slot to be encompassed by the (deformed and bonded) metal component 56 in the processed state. The substitute component 68 may have a basically planar shape and a basically lateral extension. Generally, the substitute component 68 may comprise a (vertical) thickness or height extension which is significantly smaller than its longitudinal extension and its lateral extension. By way of example, the vertical extension of the substitute component 68 may be in the range of 0.1 mm to 0.18 mm (millimeter). Consequently, a respective guide slot kept clear by the substitute component 68 may comprise a similar vertical extension (or clearance dimension).

The substitute component 68 may be formed from an appropriate material, for instance from a plastic material or from a metal material. It is particularly preferred that the substitute component 68 comprises a considerably high melting point or melting temperature which is preferably higher than a process temperature of a plastic material that is molded to the metal component 56 in an downstream manufacturing stage.

The substitute component 68 may comprise at least one bending edge 70, preferably a first bending edge 70*a* and a second bending edge 70*b*. The at least one bending edge 70 preferably extends in the lateral direction Y. At the at least one of the first bending edge 70*a* and the second bending edge 70*b*, the metal component 56 may be deformed or bent so as to define the metal shell. In other words, a respective frontal portion 72 and a respective rear portion 74 may be folded or bent around the respective first and second bending edges 70*a*, 70*b*. In the bent state, refer also to FIG. 5, the frontal portion 72 and the rear portion 74 may commonly define the second wall portion 60. A respective bending or folding direction is indicated in FIG. 4 by respective curved arrows denoted by reference numerals 76*a*, 76*b*. Bending the frontal portion 72 and the rear portion 74 may induce pre-stressing or pre-tensioning the metal component 56. By way of example, a characteristic springback of the metal component may have to be considered. On the other hand, the metal component 56 may be over-bent so as to achieve a desired shape without significant pre-stresses.

Even in case springback effects have to be expected, the desired shape of the deformed metal component 56 may be achieved. This may involve fixating the bent state or configuration of the metal component 56. To this end, the substitute component 68 may remain in the metal shell formed by the metal component 56 after the bending process. Furthermore, respective narrow sides 80*a*, 80*b* at longitudinal ends of the metal component 56 may be connected in the bent state so as to ensure that the metal component 56 keeps its desired shape.

As can be best seen from FIG. 5, the frontal portion 72 and the rear portion 74 approach each other in the deformed state. More particularly, respective narrow sides 80*a*, 80*b* face each other in a contact zone 84 at the bottom side of the substitute component. In the contact zone 84, a gap between the frontal portion 72 and the rear portion 74 may be provided. It is preferred that the narrow sides 80*a*, 80*b* are bonded to each other in the contact zone 84. To this end, at least one bonding spot 86 may be generated. By way of example, bonding may involve laser bonding, particularly laser spot bonding. Consequently, a basically closed shell or loop may be provided. As can be further seen from FIG. 5, at least one opening 82 may be provided at the bottom side of the (deformed) metal component 56. The at least one opening 82 may be defined by respective cut-outs 64*a*, 64*b* in the frontal portion 72 and the rear portion 74 of the metal component 56.

As can be further seen from FIG. 5, a bending zone 88 may define a transition between the first wall portion 58 (hidden in FIG. 5) and the second wall portion 60. Each of the at least one bending edge 70 of the substitute component 68 may define a respective bending zone 88 which may consequently form at least one toothed leading edges 30*a*, 30*b*.

Figure 6:
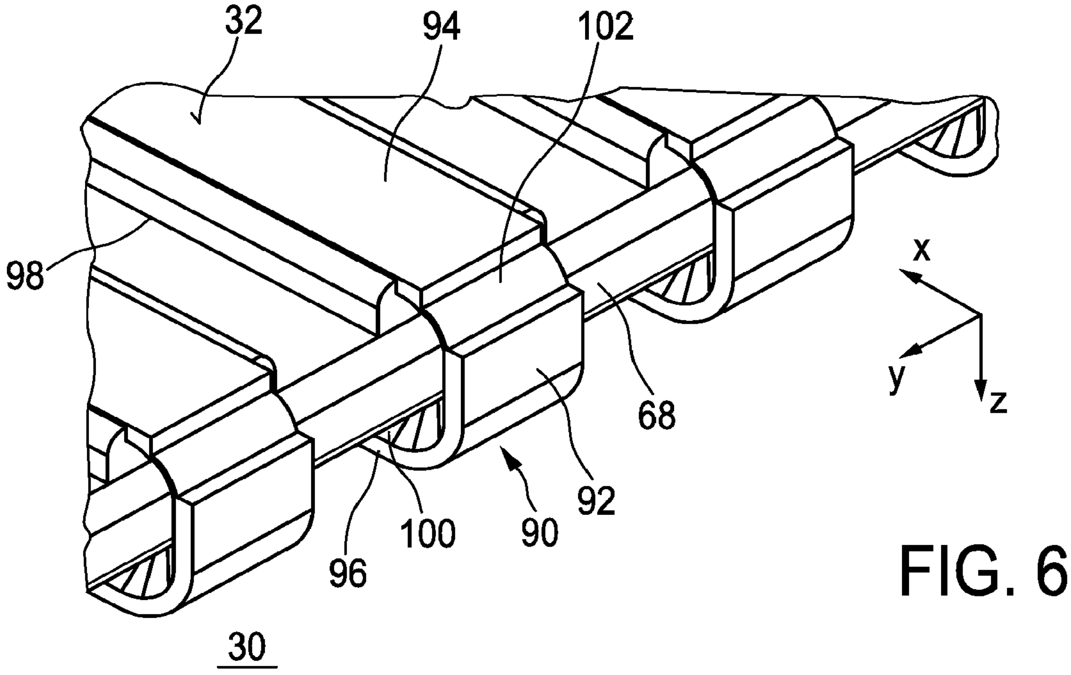
FIG. 6 is a partial perspective top view of the metal component shown in FIG. 5, wherein teeth of the metal component are illustrated in more detail.

FIG. 6 shows a partial detailed perspective top view of a respective toothed leading edge 30, or cutting edge. A top side of the arrangement shown in FIG. 6 is indicated by reference numeral 32. The top side may also be referred to as skin facing side. An arrangement of teeth 90 and respective tooth slots may be provided at the toothed leading edge 30. The teeth 90 may comprise respective tooth tips 92 which are formed at a transition between a first leg 94 and a second leg 96 of the teeth 90. The first leg 94 may be arranged at the first wall portion 58. The second leg 96 may be arranged at the second wall portion 60. The first leg 94, the second leg 96 and the tooth tip 92 may jointly define a U-shaped cross section of the teeth 90.

Generally, the teeth 90 may be regarded as strips between the slots 62*a*, 62*b* in the (sheet) metal component 56, refer also to FIG. 3. It is particularly preferred that respective portions or sections of the strips are further machined. By way of example, at least one cutting edge 98 may be provided at the first leg 94. The at least one cutting edge 98 may basically extend in the longitudinal direction X. The at least one cutting edge 98 may be arranged to cooperate with respective cutting edges of the movable cutter blade, refer also to FIG. 11 in this regard. It may be further preferred that at least one tapering 100 is provided at the second leg 96 and, at least in some embodiments, at the tooth tip 92. The tapering 100 may extend towards the first leg 94, refer also to FIG. 11. Furthermore, at least one recess 102 may be provided at the tooth tip 92, particularly at a transition between the tooth tip 92 and the first leg 94. Basically, the tapering 100 and, if any, the at least one recess 102 may be filled with plastic material during the formation of the plastic component of the stationary blade 22. The at least one recess 102 may further have the advantage that bending or folding the metal component 56 is further simplified. The smaller the thickness of the metal component 56 in the bending zone 88, the better the teeth 90 may be brought into their desired shape.

Figure 7:
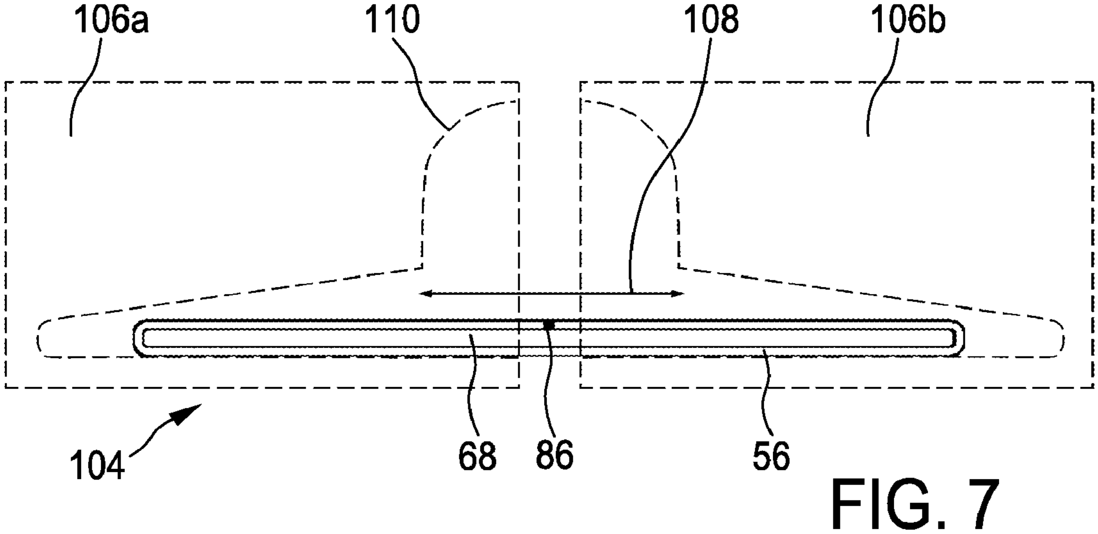
FIG. 7 is a side view of a metal component defining a metal shell, wherein a mold, particularly an injection mold is indicated by dashed lines.
Figure 8:
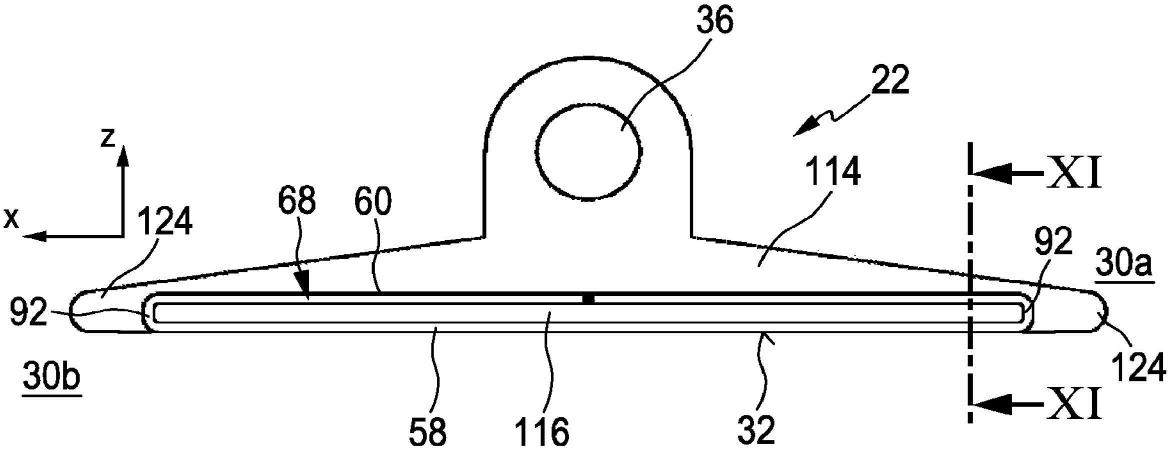
FIG. 8 is a side view of a stationary blade comprising a plastic component and a metal component, wherein the stationary blade is formed by a molding process, wherein the plastic component is molded to the metal component.

Further reference is made to FIG. 7 and FIG. 8. As can be best seen from FIG. 7, the metal shell formed by the deformed and bonded metal component 56 may be arranged in a molding tool or mold 104, particularly an injection molding mold. As indicated in FIG. 7 by a simplified dashed line representation, the mold 104 may comprise mold halves 106*a*, 106*b* that may approach each other and be removed from each other in an opening direction 108. As indicated in FIG. 7 by reference numeral 110, the mold 104 may define an outer shape of a plastic component 114 that may be formed or molded in the mold 104. The metal component 56 and the substitute component 68 may be arranged in the mold 104. Consequently, plastic material may be molded to the metal component 56. An obtained stationary blade 22 may be therefore regarded as an integrally formed stationary blade 22. More particularly, the stationary blade 22 may be regarded as an insert-molded stationary blade, an outsert-molded stationary blade or an overmolded stationary blade. As can be best seen from FIG. 8, the plastic component 114 may be generally arranged at the second wall portion 60 of the metal component 56. Furthermore, also respective tooth tips 92 may be covered by the plastic component 114, forming tooth ends 124. Generally, the plastic component 114 may cover a bottom side of the metal component 56. The plastic component 114 may also cover at least one bonding spot 86 at the second wall portion 60. Since the substitute component 68 remains in the metal component 56 during the molding operation, a respective inner guide slot 116 may be kept clear during the molding process. Consequently, the inner guide slot 116 may be revealed by removing the substitute component 68. The inner guide slot 116 may be arranged to receive the moveable cutter blade 24, refer also to FIG. 13.

Generally, the plastic component 114 may further stiffen or strengthen the inner metal shell formed by the metal component 56. Furthermore, the desired geometry of the metal component 56 may be kept when the substitute component 68 is removed from the inner guide slot 116.

Figure 9:
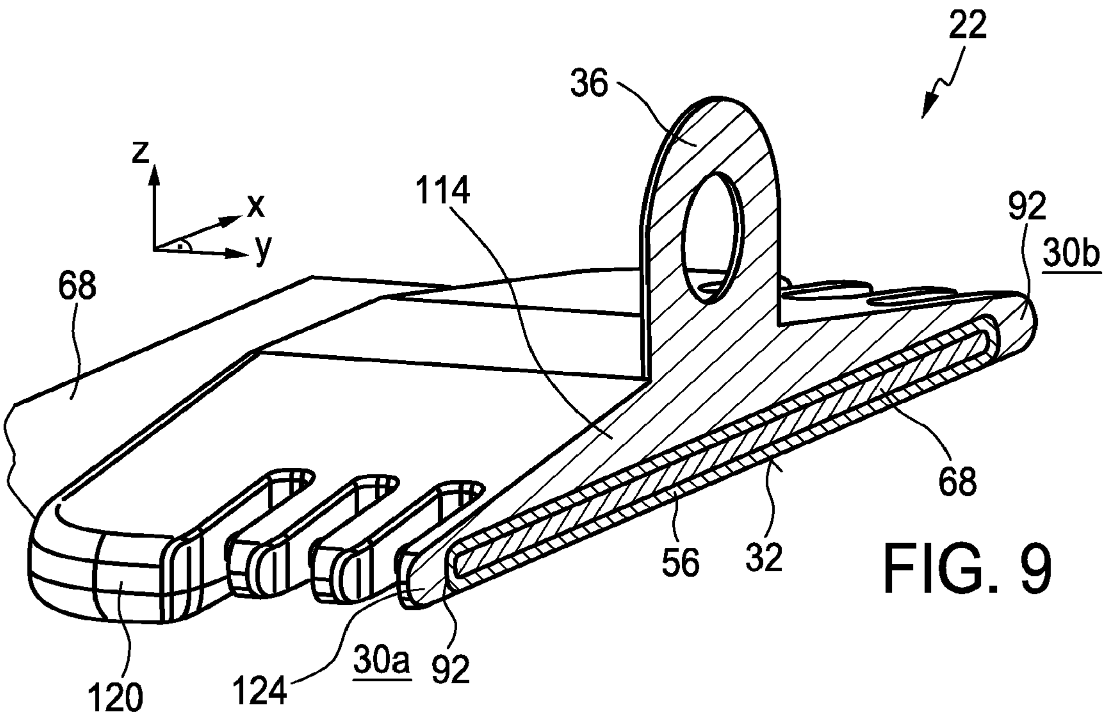
FIG. 9 is a partial perspective bottom view of a stationary blade, wherein a bending core remains in a guide slot thereof.

Further reference is made to FIG. 9. FIG. 9 is a cross-sectional perspective bottom view of an integrally formed metal-plastic composite stationary blade 22. The plastic component 114 may further define at least one mounting element 36 of the stationary blade 22. The at least one mounting element 36 may be arranged as a snap-on mounting element, refer also to FIG. 13. As can be further seen from FIG. 9, the plastic component 114 may further define at least one lateral protecting element 120 that may be arranged to cover or shield lateral ends of the metal component 56. Consequently, potentially sharp lateral edges of the metal component 56, particularly of the first wall portion 58 thereof, may be covered by the relatively soft plastic component 114. Furthermore, the at least one lateral protection element 120 may comprise a smoothened portion which may involve a chamfering or at least one radiused section. As can be further seen from FIG. 9, also respective tooth tips 92 may be smoothened due to tooth ends 124 formed by the plastic component 114.

Figure 10:
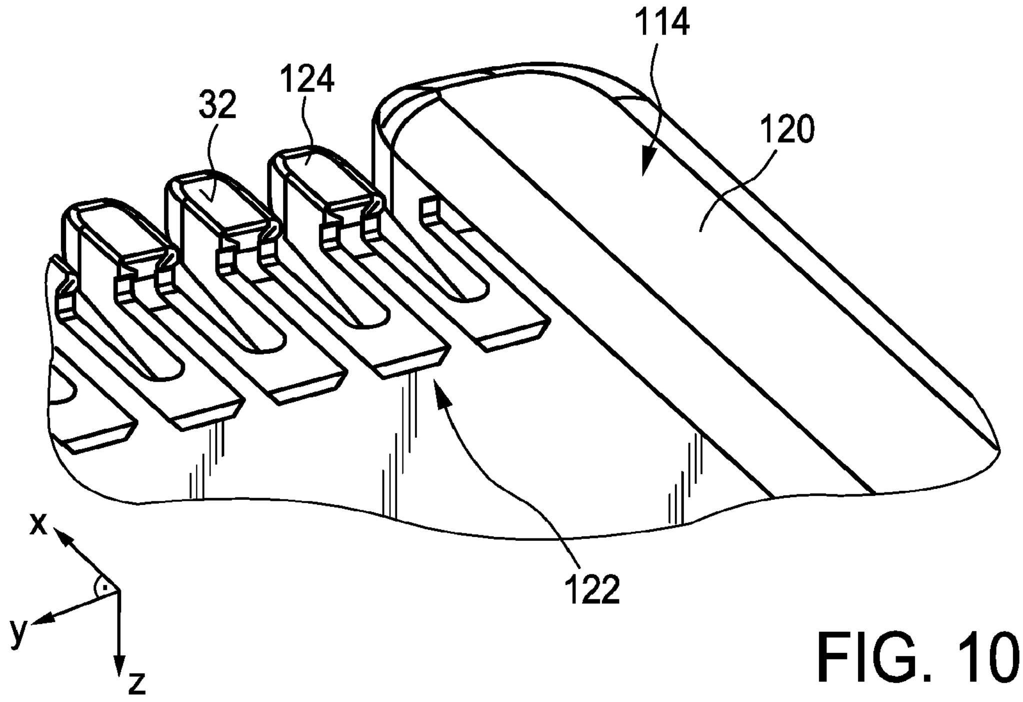
FIG. 10 is a partial perspective top view of the plastic component of the stationary blade, wherein the metal component is hidden for illustrative purposes.

Further reference is made to FIG. 10. FIG. 10 illustrates a partial perspective top view of the plastic component 114.

The metal component 56 is hidden in FIG. 10 for illustrative purposes. Also the plastic component 114 may define respective plastic tooth ends 124 that are preferably bonded to the second leg 96 and respective tooth tips 92 of the metal component 56. The tooth ends 124 may define recessed seatings 122 which basically receive the second leg 96 and, at least partially, the tooth tip 92 of respective teeth 90 of the metal component 56. Consequently, the plastic component 114 may be tightly and firmly bonded to the metal component 56, also at the at least one toothed leading edges 30*a*, 30*b*.

Figure 11:
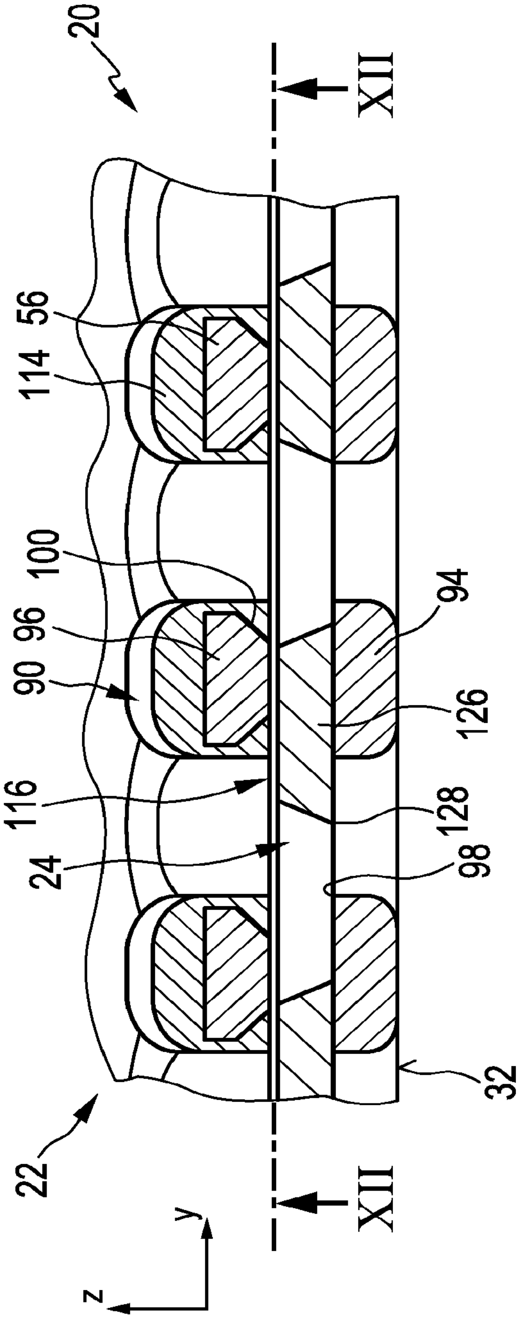
FIG. 11 is a partial cross-sectional view of a blade set comprising a stationary blade and a movable cutter blade, the view taken along the line XI-XI in FIG. 8.
Figure 12:
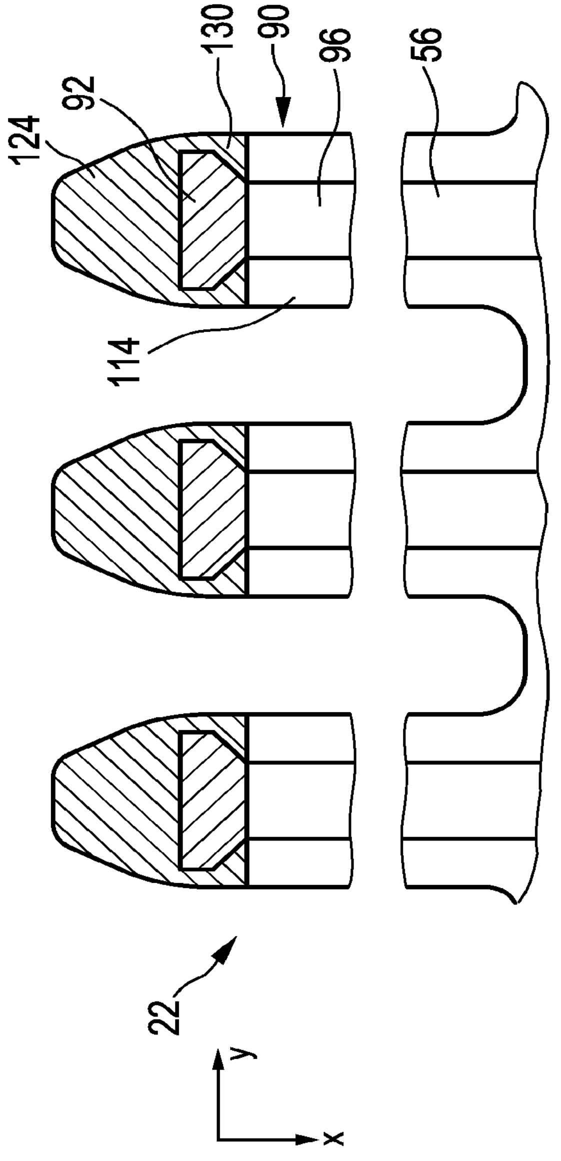
FIG. 12 is a partial broken view of a stationary blade taken along the line XII-XII in FIG. 11.

Further reference is made to FIG. 11 and FIG. 12. FIG. 11 is a cross-sectional frontal view of a blade set 20, refer also to the line XI-XI in FIG. 8. As can be best seen from FIG. 11, a moveable cutter blade 24 may be arranged in the inner guide slot 116 defined by the stationary blade 22. The moveable cutter blade 24 may comprise a plurality of teeth 126 which may comprise, at a skin facing or top side thereof cutting edges 128 that are configured to cooperate with respective cutting edges 98 of the first leg 94 of the teeth 90 of the stationary blade 22. The moveable cutter blade 24 may be reciprocatingly driven in the lateral direction Y in the inner guide slot 116. Consequently, hairs that enter respective slots between the teeth 90, 126 may be cut.

As can be further seen from FIG. 11, a lateral extension of the first leg 94 may be greater than a lateral extension of the second leg 96. This may have the advantage that also lateral sides of the second legs 96 may be coated or covered with the plastic material of the plastic component 114. So as to further improve the bonding force or fit between the plastic component 114 and the second legs 96, a respective tapering 100 may be provided at the top side or skin facing side of the second legs 96. Consequently, the tapering 100 may be filled with plastic material. As can be best seen from FIG. 12, a similar tapering 130 may be provided at the tooth tips 92 of the teeth 90. Consequently, the plastic component 114 may be bonded to the metal component 56 even more firmly. The plastic component 114 may surround a substantial cross-sectional portion of the tooth tips 92. Preferably, the outwardly facing sides of the teeth 90 are fully covered by the plastic component 114 at the tooth tips 92 and the second leg 96. Preferably, an overall lateral extension of the coated second legs 96 corresponds to an overall lateral extension of the first legs 94.

Figure 13:
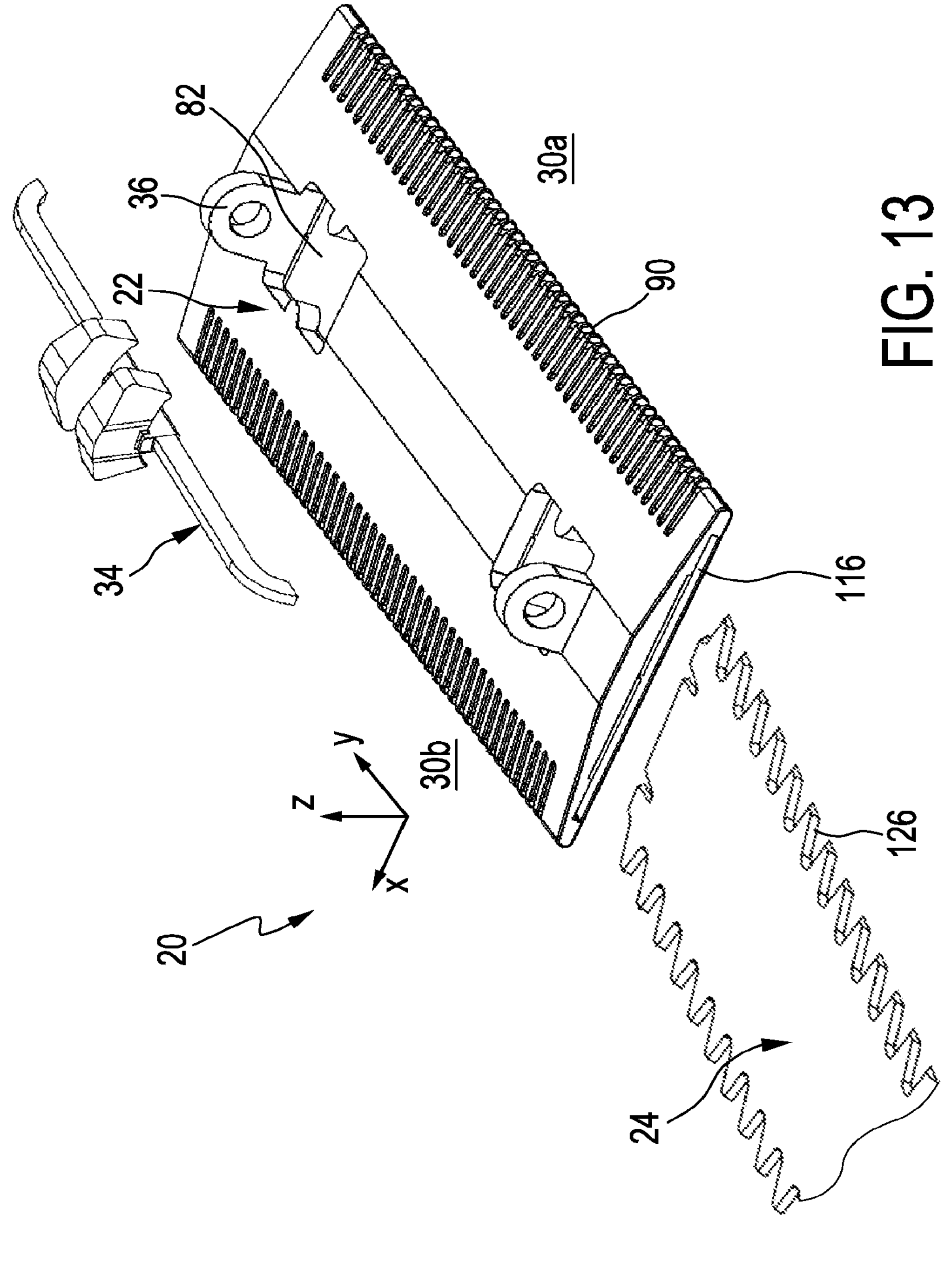
FIG. 13 is a partial exploded perspective bottom view of a blade set for a hair cutting appliance, wherein components thereof are shown in a disassembled state.

With further reference to FIG. 13, a perspective view of a blade set 20 is provided, the blade set 20 comprising a stationary blade 22 and a moveable cutter blade 24 which is shown in a detached state. The moveable cutter blade 24 may be inserted into the inner guide slot 116 defined between the first leg 94 and the second leg 96 of the stationary blade 22. To this end, the moveable cutter blade 24 may be inserted through a lateral opening of the stationary blade 22. In the mounted state, teeth 126 of the moveable cutter blade 24 may cooperate with teeth 90 of the stationary blade 22 to cut hair.

In the inserted state of the moveable cutter blade 24, a driving force transmitting member 34 may be coupled thereto. The driving force transmitting member 34 may extend through at least one opening 82 in the second leg 96. The driving force transmitting member 34 may be configured to be engaged by a drive shaft 48 of a drive train of a hair cutting appliance 10, refer also to FIG. 2. Furthermore, at least one mounting element 36 may be arranged at the second leg 96. Preferably, the at least one mounting element 36 is formed by the plastic component 114. By way of example, as can be seen from FIG. 13, the at least one mounting element 36 may generally extend in the vertical direction Z. The at least one mounting element 36 may comprise a mounting recess or projection that generally extends in the lateral direction Y. The at least one mounting element 36 may comprise a respective mounting hole that may engage a mounting partner contour so as to attach the blade set 20 to the hair cutting appliance 10.

Figure 14:
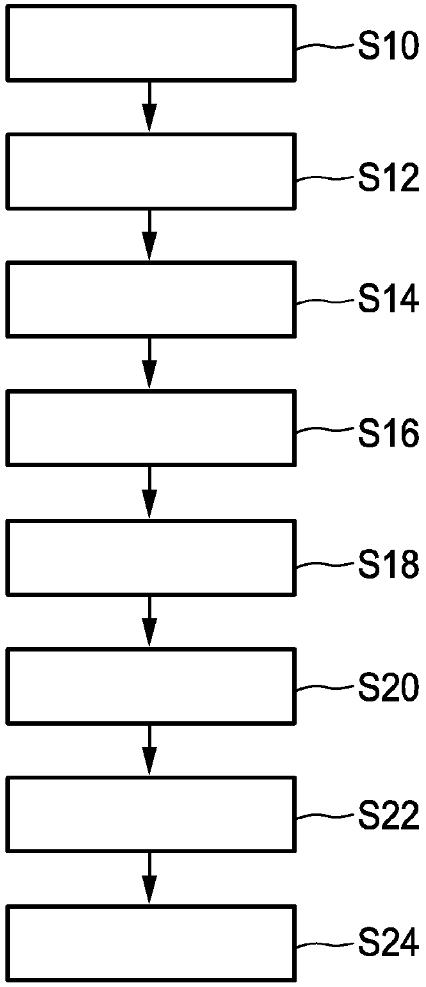
FIG. 14 shows an illustrative block diagram representing several steps of an embodiment of a method for manufacturing a stationary blade in accordance with several aspects of the present disclosure.

With reference to FIG. 14, an exemplary manufacturing method for a stationary blade 22 of a blade set 20 in accordance with several aspects of the present disclosure is illustrated and further detailed. At a first step S10 a substantially raw material or semi-finished material for forming a metal component of the stationary blade may be provided. This may involve providing a sheet metal material or blank. Providing a sheet metal material may further involve supplying the sheet metal material from a coil. A respective intermediate metal material may comprise a plurality of portions, each of which defining a to-be-finished metal component for the stationary blade. For instance, each of these defined precursor portions may be pre-processed by stamping or another adequate cutting method.

A further step S12 may follow which may include forming at least one pattern of slots in the to-be-processed metal components. Preferably, the slots are arranged in parallel and alternate with strips that are arranged between neighboring slots. Forming at least one pattern of slots may further involve machining the metal component which may involve machining substantially longitudinally extending slots, forming cutting edges at a first wall portion of the slots and preferably forming tapered portions at a second wall portion of the slots. This may have the advantage that—in a following bending step—U-shaped teeth defined by the first wall portion and the second wall portion may be formed, wherein each "leg" of the teeth is adequately suited to its defined purpose. The first wall portion which may be regarded as skin-facing wall portion may be fitted with relatively sharp cutting edges. The second wall portion which is (in the finished state) opposite to the first wall portion may be adequately adapted to be covered by a plastic component. Generally, the step of forming the at least one pattern of slots may involve at least one process selected from the group consisting of cutting, particularly laser cutting, etching, particularly electrochemical etching, stamping, coining, eroding, particularly wire-eroding, and combinations thereof.

A further step S14 may follow which may involve arranging a bending core at the substantially flat metal component. The bending core may be regarded as a bending gage. The bending core may basically correspond to a to-be-formed guide slot in the stationary blade. The bending core may hold down a first wall portion of the metal component. The bending core may generally extend in a lateral direction. The bending core may cover a defined portion of the slots and the respective strips of the at least one pattern of slots. The bending core may comprise basically laterally extending bending edges which may define tooth tips to be formed through a bending process at a transition between the first wall portion and the second wall portion of the metal component. Consequently, by bending the metal component around the bending core, at least one toothed leading edge may be formed which comprises a plurality of teeth that comprise a U-shaped cross-section.

In a further step S16, an inner metal shell may be formed by bending the metal component around the bending core. A respective bending zone may be arranged at the at least one pattern of slots. By way of example, the first wall portion is formed from a central portion of the substantially flat metal component. The first wall portion may be formed from a frontal portion and a rear portion that are arranged at opposite ends of the substantially flat metal component, wherein the first wall portion and the second wall portion jointly form the teeth of at least one toothed leading edge. Since the bending core may act as a bending gage, a defined guide slot may be formed between the first wall portion and the second wall portion. A cross section of the guide slot may correspond to a cross section of the bending core. In the bent state, the frontal portion and the rear portion may be bonded so as to fixate the shape of the formed metal shell. This may involve bonding respective narrow edges of the frontal portion and the rear portion.

In a further step S18, a mold, particularly an injection-molding mold may be provided which is configured to receive the bent metal component. In the guide slot between the first wall portion and the second wall portion of the metal component, a substitute component may be placed. It is particularly preferred that the bending core remains in the guide slot after the bending step. Consequently, the substitute component may be embodied by the bending core. However, in some embodiments the bending core may be removed after the bending step which involves that a separate substitute component is arranged in the guide slot to keep clear the guide slot. The mold may be arranged to define a shape of a to-be-formed plastic component. The mold may be further arranged to allow the plastic component to be firmly bonded to the metal component. A step S20 may follow which involves arranging or placing the metal component including the substitute component in the mold.

In a further step S22, the molding may take place. Fluid plastic material may be injected in the mold so as to fill a cavity in the mold. In this way, the plastic component may be formed. The molding step may involve molding the plastic material to the metal component. Consequently, the plastic component and the metal component may be coupled in an undetachable manner. Generally, the step S22 may create an integrally formed metal-plastic composite stationary blade. Particularly, the step S22 may be referred to as insert-molding step. In some embodiments, the step S22 may be regarded as an outsert-molding step. The metal component may be therefore regarded as the insert or outsert component. In yet some further embodiments, the step S22 may be regarded as an overmolding step. Due to the substitute component, the guide slot is kept clear of the plastic material.

A further step S24 may follow which may include removing the integrally formed metal-plastic composite stationary blade comprising the metal inner shell and the plastic component from the mold. The step S24 may further include removing the substitute component from the guide slot. This may reveal the guide slot. The guide slot may be arranged for a defined mating for a to-be-mounted movable cutter blade at the stationary blade.

Figure 15:
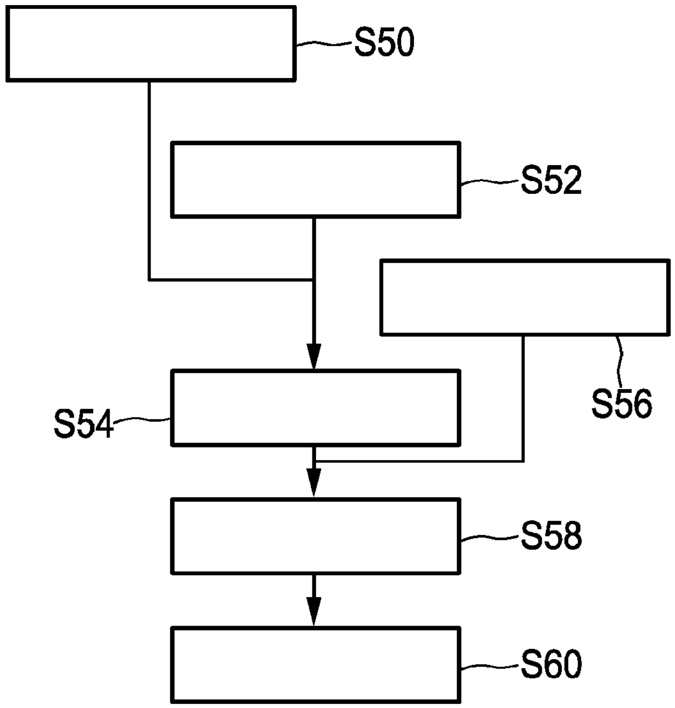
FIG. 15 shows a further illustrative block diagram representing several steps of an embodiment of an exemplary method of manufacturing a blade set in accordance with several aspects of the present disclosure.

FIG. 15 illustrates an exemplary manufacturing method for a blade set including a stationary blade and a movable cutter blade formed in accordance with at least some aspects of the present disclosure. The method may include a step S50 comprising providing a stationary blade. The stationary blade may be formed in accordance with the exemplary manufacturing method illustrated in FIG. 14. A further step S52 may include providing a movable cutter blade. The movable cutter blade that may be configured to cooperate with a stationary blade arranged in accordance with at least some aspects of the present disclosure. Generally, a precursor for the movable cutter blade or a semi-finished movable cutter blade may be provided. This may involve providing sheet metal material which may comprise a predefined row or array of a plurality of to-be-processed movable cutter blades. A further step may follow which may include forming or processing toothed leading edges of the movable cutter blade. This step may further include processing relatively sharp cutting edges at respective teeth of the toothed leading edge. This step may further include adequate material-removing processes. By way of example, an integrated etching step may comprise forming a general toothed shape at the toothed leading edge, and forming relatively sharp cutting edges at the teeth. A further step may follow which may include separating respective movable cutter blades from a supporting structure including a row or an array of a plurality of movable cutter blades.

A joining or mating step S54 may follow in which the movable cutter blade is inserted into a guide slot at the stationary blade. Inserting the movable cutter blade into the guide slot of the stationary blade may involve laterally inserting the movable cutter blade through a lateral opening of the stationary blade.

In a further step S56, a transmitting member may be provided. The transmitting member may be arranged to contact the movable cutter blade and to set the movable cutter blade into motion with respect to the stationary blade. The transmitting member may be arranged to be engaged by a drive train of the hair cutting appliance.

A further step S58 may follow which may involve feeding the transmitting member to the semi-finished assembly of the blade set. The step S58 may particularly involve feeding the transmitting member in a feeding direction that is different from an insertion direction of the movable cutter blade. A further step S60 may follow which includes attaching the transmitting member to the movable cutter blade. The step S60 may further include bonding the transmitting member to the movable cutter blade. Bonding may involve welding, particularly laser welding. Attaching the movable cutter blade and the transmitting member while both elements are positioned at the stationary blade may lock the movable cutter blade at the stationary blade. This may be particularly beneficial since in this way no separate fastening or locking components for the movable cutter blade are required.

It may be generally preferred that the blade set consists of no more than the stationary blade, the movable cutter blade, and, if any, the transmitting member.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. A blade set, the blade set comprising:

a stationary blade comprising a first wall portion and a second wall portion integrally formed from a metal component and defining a guide slot, at least one first toothed leading edge, and a plastic component;

a substitute component disposed in the guide slot of the stationary blade so as to occupy the guide slot during molding, the stationary blade being bent around the substitute component, thereby defining the guide slot, the stationary blade further comprising a frontal portion and a rear portion that after the bending, together define the second wall portion and are adjacent to each other, the substitute component being configured to be removed after molding to reveal the guide slot configured to receive a movable cutter blade, wherein: the first wall portion of the stationary blade is arranged to face skin when in operation, wherein the plastic component of the stationary blade is molded to the second wall portion and extends outward from the at least one toothed leading edge of the stationary blade thereby forming at least one tooth end of the plastic component, and wherein the plastic component comprises at least one mounting element.

2. The blade set of claim 1, wherein the teeth of the at least one toothed leading edge of the stationary blade comprise, when viewed in a cross-sectional plane perpendicular to a lateral direction (Y), a substantially U-shaped form comprising a first leg at the first wall portion and a second leg at the second wall portion, the first leg and the second leg merging into one another at respective tips of the first leg and the second leg.

3. The blade set of claim 2, wherein the first leg, when viewed in a cross-sectional plane perpendicular to a longitudinal direction (X), comprises lateral cutting edges, and wherein the second leg, when viewed in a cross-sectional plane perpendicular to the longitudinal direction (X), comprises a tapered portion at a side facing the first wall portion, wherein the tapered portion is covered with plastic material of the plastic component.

4. The blade set of claim 1, wherein the at least one toothed leading edge of the stationary blade is a first toothed leading edge, and the stationary blade further comprises:

a second toothed leading edge, wherein: the first wall portion extends from the first toothed leading edge to the second toothed leading edge in a continuous fashion; the frontal portion extending from the first toothed leading edge of the stationary blade to a center portion, and the rear portion extending from the second toothed leading edge to the center portion; and narrow sides of the frontal portion and the rear portion face each other at the center portion.

5. The blade set of claim 1, wherein the second wall portion of the stationary blade is at least partially offset from the first wall portion, such that the first wall portion and the second wall portion are arranged to mutually define an inner metal shell of the stationary blade, further comprising at least one opening in the inner metal shell, the at least one opening providing vertical access to an inner space of the inner metal shell.

6. The blade set of claim 1, wherein a gap exists between the frontal portion and the rear portion.

7. The blade set of claim 6, wherein the frontal portion and the rear portion are bonded together at one more bonding spots.

8. The blade set of claim 7, wherein the plastic component covers at least one of the one more bonding spots.

9. The blade set of claim 1, wherein the at least one mounting element is arranged as a snap-on element.

10. The blade set of claim 1, wherein the second wall portion comprises at least one cutout portion defining at least one opening to the guide slot for a transmitting member.

11. The blade set of claim 1, wherein the plastic component extends around at least one corner of the metal component.

12. The blade set of claim 11, wherein the plastic component has a radius around the at least one corner of the metal component.

13. The blade set of claim 1, wherein the at least one toothed leading edge of the stationary blade is jointly formed by the first wall portion and the second wall portion and comprises a plurality of teeth.

* * * * *